United States Patent [19]
Nakamura

[11] Patent Number: 5,701,196
[45] Date of Patent: Dec. 23, 1997

[54] STEREOMICROSCOPE

[75] Inventor: Shinichi Nakamura, Hino, Japan

[73] Assignee: Olympus Optical Co., Ltd, Tokyo, Japan

[21] Appl. No.: 249,845

[22] Filed: May 26, 1994

[30] Foreign Application Priority Data

Nov. 5, 1993 [JP] Japan ................. 5-299136

[51] Int. Cl.$^6$ ............... G02B 21/36; G02B 21/02; G02B 3/00; G02B 15/14

[52] U.S. Cl. ................ 359/362; 359/656; 359/657; 359/658; 359/659; 359/661; 359/692; 359/664; 359/654

[58] Field of Search .............. 359/656, 657, 359/658, 659, 660, 661, 666, 362, 376, 379, 380, 381, 382, 383, 387, 692, 664, 654

[56] References Cited

U.S. PATENT DOCUMENTS

| | | | |
|---|---|---|---|
| 3,664,724 | 5/1972 | Klein | 359/376 |
| 3,813,172 | 5/1974 | Walker et al. | 356/225 |
| 4,054,126 | 10/1977 | Shoemaker | 359/661 |
| 4,155,622 | 5/1979 | Klein | 359/661 |
| 4,448,498 | 5/1984 | Muller et al. | 359/661 |
| 4,991,947 | 2/1991 | Sander et al. | 359/375 |
| 5,000,548 | 3/1991 | Klein | 359/661 |
| 5,059,005 | 10/1991 | Kawano | 359/661 |
| 5,227,920 | 7/1993 | Shibayama | 359/693 |
| 5,394,267 | 2/1995 | Hanzawa | 359/376 |
| 5,398,135 | 3/1995 | Ohashi | 359/692 |
| 5,473,473 | 12/1995 | Estelle et al. | 359/692 |

FOREIGN PATENT DOCUMENTS

| | | | |
|---|---|---|---|
| 3626603 | 2/1987 | Germany | 359/654 |
| 9016892 | 4/1991 | Germany . | |
| 36782 | 9/1972 | Japan | 359/661 |
| 103362 | 8/1979 | Japan | 359/387 |
| 146112 | 11/1981 | Japan | 359/387 |
| 405113540 | 5/1993 | Japan | 359/661 |

Primary Examiner—Paul M. Dzierzynski
Assistant Examiner—Mohammad Y. Sikder
Attorney, Agent, or Firm—John K. Corbin

[57] ABSTRACT

A stereomicroscope comprising an objective lens system and eyepiece lens systems, the objective lens system comprising at least two lens units, permitting a working distance thereof by varying at least one airspace and having a concave surface at a location farthest from an object to be observed so as to minimize lowering of the magnification of the stereomicroscope and stereoscopic impressions of images observed through the stereomicroscope.

9 Claims, 13 Drawing Sheets

STEREOMICROSCOPE

BACKGROUND OF THE INVENTION a) Field of the Invention

The present invention relates to a stereomicroscope which is capable of changing a working distance thereof.

b) Description of the Prior Art

Some of the conventional stereomicroscopes are configured so as to permit changing working distances thereof simply by displacing lens components preliminarily disposed therein, or without exchanging the lens components with others. It is desired, for surgical microscopes in particular, to configure them so as to permit changing working distances threreof.

Known as a surgical microscope is the one which was disclosed by West German Patent Publication No. 2,439, 820. This microscope comprises an objective lens system consisting of a combination of a positive lens component and a negative lens component, and is congfigured so as to permit changing a working distance thereof by displacing the positive lens component while keeping the negative lens component stationary in the objective lens system.

Further, the surgical microscope disclosed by West German Utility Model Publication No. 9,003,458 uses an objective lens system which has the same composition as that of the objective lens system of the above-described surgical microscope and is configured so as to permit changing a working distance thereof steplessly from 150 mm to 450 mm by varying approximately 30 mm an airspace reserved between the positive lens component and the negative lens component.

Since the conventional objective lens systems which are configured so as to permit working distances thereof as described above have focal lengths longer than the working distances thereof, these lens systems have a common defect that they provide total magnifications of microscopes using the objective lens systems and stereoscopic impressions of images observed through the microscopes which are lower than those obtainable with the conventional objective lens system which has a fixed focal point (a focal length nearly equal to a working distance) and a working distance equal to that of the former objective lens systems.

FIG. 13 shows a composition of an optical system for a Galilean stereomicroscope which is used as an ordinary surgical microscope. This optical system consists, in order from the object side, of a single objective lens syste 1 which is common to a right side lens system and a left side lens system as well as afocal vari-focal lens systems 2, imaging lens systems 3, porro prisms 4 for correcting a posture of an image and eyepiece lens systems 5 which are disposed in the right and left lens systems respectively. This optical system as a whole has a total magnification B expressed by the following formula (1):

$$B \leq (f_3/f_0) \times \beta_A \times \beta_E \qquad (1)$$

wherein the reference symbol $f_0$ represents a focal length of the objective lens system 1, the reference symbol $f_3$ designates a focal length of the imaging lens component 3, the reference symbol $\beta_A$ denotes a magnification of the afocal vari-focal lens system 2 and the reference symbol $\beta_E$ represents a magnification of the eyepiece lens system 5.

Further, the stereoscopic impression of an image is proportional to an angle formed between optical axes of the right and left side lens systems intersecting with each other on the object side, or an interior angle ω which is expreses by the follosing formula (2):

$$\omega = 2\tan^{-1}(L/2f_0) \qquad (2)$$

wherein the reference symbol L represents a spacing between the optical axes of the right and left side lens systems (a baseline length).

Used as the conventional objective lens system which had a fixed focal point was a positive lens unit $L_1$ consisting of a single lens component as shown in FIG. 14. In this case, the objective lens system had a focal length $f_0$ which is nearly equal to working distance WD thereof. An Objective lens system which consists of a negative lens component $L_2$ and a positive lens component $L_3$, like the conventional example shown in FIG. 15, for permitting a working distance thereof has a focal length $f_0$ approximately 1.5 to 1.7 times as long as a working distance WD thereof in particular when the objective lens system has a short working distance (approximately 150 mm). As a result, this objective lens system provides a total magnification of a microscope using this objective lens system and a stereoscopic impression of an image observed through the microscope which are 1/1.5 to 1/1.7 times of those of a microscope using the conventional objective lens system having the fixed focal length and a working distance which is the same as that of the former objective lens system, as is understood from the above-mentioned formulae (1) and (2).

Description will be made further quantitatively of the fact that the conventional objective lens system composed of the two lens components has the focal length $f_0$ which is longer than the working distance WD thereof. FIG. 16 shows a diagram visualizing a refractive power distribution in a conventional objective lens system which consists, in order from the object side, of a negative lens component $L_4$ and a positive lens component $L_5$ for permitting changing a working distance thereof. On the basis of this drawing, the objective lens system as a whole has a focal length $f_0$ which is expressed by the following formula (3):

$$f_0 = f_p \cdot f_n/(f_p + f_n - D) \qquad (3)$$

wherein the reference symbol $f_n$ represents a focal length of the negative lens component $L_4$, the reference symbol $f_p$ designates a focal length of the positive lens component $L_5$, and the reference symbol D denotes a distance as measured between principal points of the negative lens component $L_4$ and the positive lens component $L_5$.

Further, the working distance WD of the objective lens system is expressed by the following formula (4):

$$WD = (f_p \cdot f_n - D \cdot f_n)/(f_p + f_n - D) \qquad (4)$$

From the formulae (3) and (4), a ratio between the focal length and the working distance of the objective lens system is given by the following formula (5)

$$f_0/WD = f_p \cdot f_n/(f_p \cdot f_n - D \cdot f_n) \qquad (5)$$

$$= 1/(1 - D/f_p) \qquad (5')$$

In embodiments of the above-mentioned West German Utility Model publication No. 9,003,458, values of $f_0$/WD are calculated as listed below:

EMBODIMENT 1

$f_n = -108.1$, $f_p = 102$

At D=37.5, WD=160, $f_0$=253 and $f_0$/WD=1.6

At $D=15.6$, $WD=430$, $f_O=507.7$ and $f_O/WD=1.2$

EMBODIMENT 2

$f_n=-116$, $f_p=108.2$
 At $D=42.8$, $WD=150$, $f_O=248.1$ and $f_O/WD=1.7$
 At $D=16$, $WD=450$, $f_O=527.9$ and $f_O/WD=1.2$

EMBODIMENT 3

$f_n=-125.4$, $f_p=113.9$
 At $D=45.6$, $WD=150$, $f_O=250.1$ and $f_O/WD=1.7$
 At $D=15.8$, $WD=450$, $f_O=522.6$ and $f_O/WD=1.2$

EMBODIMENT 4

$f_n=-132.5$, $f_p=116.6$
 At $D=38$, $WD=193.3$, $f_O=286.7$ and $f_O/WD=1.5$
 At $D=16.5$, $WD=409$, $f_O=476.5$ and $f_O/WD=1.2$ As is seen from the values of $f_O/WD$ listed above, the objective lens system disclosed by West German Utility Model Publication No. 9,003,458 has a focal length which is approximately 1.5 to 1.7 times as long as a working distance WD thereof.

For preventing lowering of a total magnification of a stereomicroscope by modifying an item other than the specification items of an objective lens system, it is conceivable to select:

(A) Increasing a value of $f_3$
(B) Increasing a value of $\beta_A$
(C) Increasing a value of $\beta_E$ The increasing the value of $f_3$ will enlarge an eyepiece tube, the increasing of the value of $\beta_A$ will make it difficult to correct aberrations in the afocal vari-focal lens system or the increasing of the value of $\beta_E$ will reduce an exit pupil of an eyepiece, thereby causing inconvenience to observation.

Further, as a measure (D) for preventing lowering of a stereoscopic impression of an image, it is conceivable to increase the baseline length L.

Out of the measures for preventing the lowerings of the total magnification and stereoscopic impression, (A), (B) and (D) are related to the basic specification items for a stereomicroscope and cannot be modified easily without adopting new design and manufacturing concepts. Further, when a stereomicroscope is equipped with the objective lens system which permits changing a working distance thereof in place of the conventional objective lens system having a fixed focal point and exchangeable with another, it is possible to compensate for the lowering of a total magnification thereof by exchanging eyepieces used therein with others having a higher magnification, but such a measure will cause inconvenience to observation and lower a stereoscopic impression of an image observed through the microscope.

Furthermore, it is desired for a stereomicroscope to illuminate a surface of an object to be observed with an illumination light bundle which is coaxial with an optical axis of an observation optical system and there has been proposed an optical system which is configured so as to lead an illumination light bundle to the surface of the object by way of a half mirror HM disposed on the object side of an objective lens system as shown in FIG. 11C. When the half mirror HM is disposed as shown in FIG. 11C, however, a mechanical working distance WD (m) of the objective lens system is shortened by a space required for accommodating the half mirror HM. For obtaining an adequate mechanical working distance, the objective lens system must have a longer optical working distance, thereby having a longer focal length. When the objective lens system has such a longer focal length, a surgical microscope which uses this objective lens system will undesirably have a lowered total length and provide an image having a lowered stereoscopic impression.

SUMMARY OF THE INVENTION

A primary object of the present invention is to provide a stereomicroscope comprising an objective lens system which has a focal length substantially the same or shorter than a working distance thereof and permits changing the working distance.

The stereomicroscope according to the present invention comprises eyepiece lens systems disposed after a single objective lens system which comprises at least two lens units and is configured so as to permit changing a working distance thereof by varying an optical path length in at least one airspace reserved between the lens units, and is characterized in that the objective lens system has a surface concave toward the side of eyes at a location farthest from an object to be observed.

The stereomicroscope according to the present invention is equivalent, for example, to a conventional stereomicroscope using an objective lens system which permits changing the working distance and comprises, in order from the object side, a negative lens unit and a positive lens unit which has a concave surface at a location farthest from an object to be observed, and permits bringing a principal point of the positive lens unit close to the negative lens unit without modifying moving distances of the negative lens unit and the positive lens unit (a variation of an airspace reserved therebetween) for changing the working distance, thereby being capable of setting the focal length close to the working distance. As a result, the stereomicroscope according to the present invention is capable of shortening the focal length of the objective lens system as a whole without strengthening a refractive power of the negative lens unit.

FIG. 11A, FIG. 11B and FIG. 11C shown diagrams descriptive of a principle of the objective lens system of the stereomicroscope according to the present invention. Though the concave surface which is disposed at the location farthest from the object to be observed is traced as an independet negative refractive power 10 in these diagrams, it does not necessarily mean a fact that a negative lens component is disposed at the location farthest from the object. This fact will be described with reference to FIG. 11A and the formula (5'). When a negative power of the concave surface is disposed as shown in FIG. 11A, the objective lens system as a whole functions as if it had a negative-positive-negative refractive power distribution and allows a marginal ray emitted from an object point on an optical axis to travel along a passage traced in the solid lines in FIG. 11A.

When it is assumed that the negative lens unit remains unchanged from the negative lens unit used in the conventional objective lens system, the negative lens units form imgaes at an unchanged location $L_n$. In order to form an image at the location $L_n$ without using the negative refractive power 10 of the concave surface, it it sufficient to dispose a refractive power having a focal length $f_n=L_n+D$ at the location indicated by the vertical line 11 traced between the negative lens unit and the positive lens unit in FIG. 11A.

In other words, the disposition of the concave surface provides an effect which is the same as that obtained by disposing a positive lens component having a shorter focal length at a location closer to the negative lens unit.

Since the effect obtained by disposing the positive lens component at the location closer to the negative lens unit or shortening the distance between the principal points of the negative lens unit and the positive lens unit, is equivalent to an effect obtained by shortening a focal length of the positive lens unit, or shortening $f_p$, the disposition of the concave surface results in an effect which is equivalent to that obtained by shortening a focal length $f_p$ of the positive lens unit and a distance D between the principal points for the same length without modifying the negative lens unit in the conventional example.

As is understood from the formula (5'), the disposition of the concave surface makes it possible to reduce a value of $f_0/WD$. In the first through fourth embodiments of the above-mentioned West German Utility Model Publication No. 9,003,458, valuyes of $f_0/WD$ were acutually calculated on an assumption that the principal point of the positive lens unit is brought closer to the negative lens unit without modifying the focal length and the moving distance of the negative lens unit. Calculation results obtained are listed below as Example 1 through Example 4:

EXAMPLE 1

$f_n=-101.1$, $f_p=80$
   At D=15.5, WD=160, $f_0$=198.4 and $f_0/WD$=1.2
   At D=-6.4, WD=430, $f_0$=298.2 and $f_0/WD$=0.93

EXAMPLE 2

$f_n=-116$, $f_p=80$
   At D=14.6, WD=150, $f_0$=183.4 and $f_0/WD$=1.2
   At D=-12.2, WD=450, $f_0$=390.3 and $f_0/WD$=0.87

EXAMPLE 3

$f_n=-125.4$, $f_p=80$
   At D=11.7, WD=150, $f_0$=175.7 and $f_0/WD$=1.2
   At D=-18.1, WD=450, $f_0$=367.1 and $f_0/WD$=0.82

EXAMPLE 4

$f_n=-132.5$, $f_p=90$
   At D=11.4, WD=193.3, $f_0$=221.1 and $f_0/WD$=1.1
   At D=-10.1, WD=409, $f_0$=367.8 and $f_0/WD$=0.9

As is seen from the examples listed above, the present invention makes it possible to bring focal lengths of objective lens systems close to working distances thereof by using variations of D which are unchanged from those selected in the embodiments of the above-mentioned West German Utility Model. By the way, D<0 means a fact that the pricipal point of the positive lens unit is located on the object side of the principal point of the negative lens unit.

When the positive lens unit has a convex surface at the location farthest from the object and the principal point of the positive lens unit is located therein, the focal length of the objective lens system can be brought close to the working distance thereof simply by strengthening the refractive power of the positive lens unit and disposing this lens unit close to the negative lens unit. In this case, however, the variation of the airspace reserved between the negative lens unit and the positive lens unit is reduced, and the refractive power of the negative lens unit is also strengthened, thereby making it difficult to correct aberrations. Further, the strengthening of the refractive power of the positive lens unit is not effective from a physical viewpoint since the positive lens unit can be brought close to the negative lens unit only within a certain limited range of distance.

For the reason described above, the most effective measure for bringing the principal point of the positive lens unit close to the negative lens unit is to configure the surface which is to be disposed at the location farthest from the object as a concave surface. This concave surface serves for progressively diverging a light bundle reasonably, suppressing production of aberrations and preventing prolongation of a total length of the lens system. Further, this concave surface makes it possible to divide the positive lens unit used in the conventional objective lens system for stereomicroscope into a negative lens unit and a positive lens unit, whereby the positive refractive power can be distributed among a plurality of surfaces so as to correct aberrations more favorably.

In the stereomicroscope according to the present invention, the objective lens system can have a composition shown in FIG. 11B which is reverse to that of the conventional objective lens system composed, in order from the object side, of the negative lens unit and the positive lens unit. When the objective lens system is composed, in order from the object side, of a positive lens unit and a negative lens unit, the objective lens system can have a focal length shorter than a working distance thereof as seen from FIG. 11B, thereby making it possible to enhance a total magnification of the stereomicroscope and a stereoscopic impression of an image observed through the microscope.

Further, the stereomicroscope according to the present invention can have a mechanical working distance which is substantially the same as a focal length thereof so that it has a high total magnification and permits observing an image with a high stereoscopic impression.

DETAILED DESCRIPTION OF THE PREFERRED EMBODIMENTS

Figure 1A:
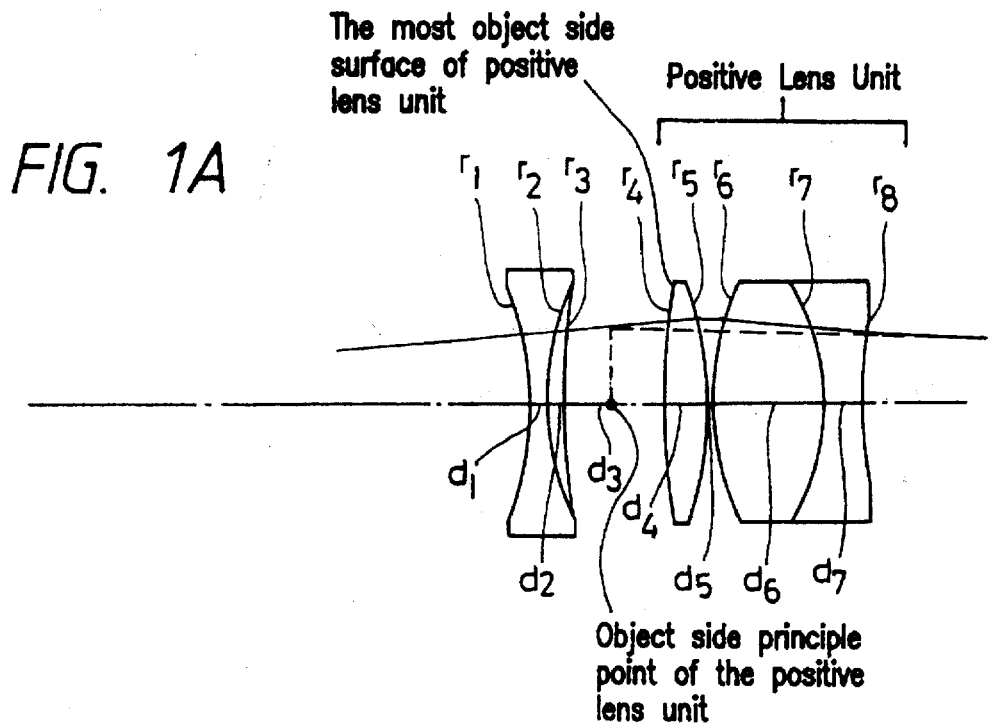
FIG. 1A, FIG. 1B, and FIG. 1C show sectional views illustrating a composition of a first embodiment of the objective lens system of the stereomicroscope according to the present invention.

Embodiments of the stereomicroscope according to the present invention will be stated in the following.

Embodiment 1

| | | | |
|---|---|---|---|
| $r_1 = -94.399$ | $d_1 = 5$ | $n_1 = 1.61272$ | $v_1 = 58.7$ |
| $r_2 = 76.544$ | $d_2 = 5.25$ | $n_2 = 1.80518$ | $v_2 = 25.4$ |
| $r_3 = 197.905$ | $d_3 = 30\sim15.32\sim1.27$ | | |
| $r_4 = 216.216$ | $d_4 = 13.28$ | $n_4 = 1.88300$ | $v_4 = 40.8$ |
| $r_5 = -108.417$ | $d_5 = 1$ | | |
| $r_6 = 75.177$ | $d_6 = 33.84$ | $n_6 = 1.48749$ | $v_6 = 70.2$ |
| $r_7 = -66.907$ | $d_7 = 11.63$ | $n_7 = 1.84666$ | $v_7 = 23.8$ |
| $r_8 = 132.222$ | | | |
| At $d_3 = 30$ | $f_n = -123.1$, | $f_p = 80.5$ | |
| $D = 12.9$, | WD = 150, | $f_o = 180.0$, | $f_o/WD = 1.2$ |
| At $d_3 = 15.32$ | $f_n = -123.1$, | $f_p = 80.5$ | |
| $D = -2$ | WD = 250, | $f_o = 245.4$, | $f_o/WD = 0.98$ |
| At $d_3 = 1.27$ | $f_n = -123.1$, | $f_p = 80.5$ | |
| $D = -16.2$ | WD = 450, | $f_o = 376.3$, | $f_o/WD = 0.84$ |

Embodiment 2

| | | | |
|---|---|---|---|
| $r_1 = -81.612$ | $d_1 = 5$ | $n_1 = 1.51742$ | $v_1 = 52.4$ |
| $r_2 = 81.559$ | $d_2 = 5$ | $n_2 = 1.84666$ | $v_2 = 23.8$ |
| $r_3 = 158.464$ | $d_3 = 30.96\sim15.34\sim0.2$ | | |
| $r_4 = 89.23$ | $d_4 = 5$ | $n_4 = 1.84666$ | $v_4 = 23.8$ |
| $r_5 = 82.517$ | $d_5 = 14.64$ | $n_5 = 1.81600$ | $v_5 = 46.6$ |
| $r_6 = -113.078$ | $d_6 = 0.2$ | | |
| $r_7 = 63.174$ | $d_7 = 7.08$ | $n_7 = 1.88300$ | $v_7 = 40.8$ |
| $r_8 = 184.475$ | $d_8 = 5.45$ | | |
| $r_9 = -125.044$ | $d_9 = 6.68$ | $n_9 = 1.75550$ | $v_9 = 25.1$ |
| $r_{10} = 52.766$ | | | |
| At $d_3 = 30.96$ | $f_n = -129.8$, | $f_p = 82.8$ | |
| $D = 13.2$ | WD = 150, | $f_o = 180.0$, | $f_o/WD = 1.2$ |
| At $d_3 = 15.34$ | $f_n = -129.8$, | $f_p = 82.8$ | |
| $D = -2.6$ | WD = 250, | $f_o = 243.8$, | $f_o/WD = 0.98$ |
| At $d_3 = 0.2$ | $f_n = -129.8$, | $f_p = 82.8$ | |
| $D = -17.9$ | WD = 450, | $f_o = 371.4$, | $f_o/WD = 0.83$ |

Embodiment 3

| | | | |
|---|---|---|---|
| $r_1 = -86.77$ | $d_1 = 5$ | $n_1 = 1.71300$ | $v_1 = 53.9$ |
| $r_2 = 57.366$ | $d_2 = 6.76$ | $n_2 = 1.85026$ | $v_2 = 32.3$ |
| $r_3 = 173.559$ | $d_3 = 20\sim9.91\sim0.93$ | | |
| $r_4 = 173.271$ | $d_4 = 13.42$ | $n_4 = 1.88300$ | $v_4 = 40.8$ |
| $r_5 = -97.276$ | $d_5 = 1\sim2.43\sim1.7$ | | |
| $r_6 = 68771$ | $d_6 = 28.83$ | $n_6 = 1.55232$ | $v_6 = 63.7$ |
| $r_7 = -56.585$ | $d_7 = 5$ | $n_7 = 1.84666$ | $v_7 = 23.8$ |
| $r_8 = 110.538$ | | | |
| $d_3 = 20$, | At $d_5 = 1$ | $f_n = -91.9$, | $f_p = 67.7$, $D = 10.7$, |
| WD = 150, | $f_o = 180.0$, | $f_o/WD = 1.2$ | |
| $d_3 = 9.91$, | At $d_5 = 2.43$ | $f_n = -91.9$, | $f_p = 67.4$, $D = 0.2$ |
| WD = 250 | $f_o = 252.7$, | $f_o/WD = 1.0$ | |
| $d_3 = 0.93$, | At $d_5 = 1.7$ | $f_n = -91.9$, | $f_p = 67.6$, $D = -8.7$ |
| WD = 450, | $f_o = 400.2$, | $f_o/WD = 0.89$ | |

Embodiment 4

| | | | |
|---|---|---|---|
| $r_1 = -116.109$ | $d_1 = 5$ | $n_1 = 1.76200$ | $v_1 = 40.1$ |
| $r_2 = 124.714$ | $d_2 = 5$ | $n_2 = 1.84666$ | $v_2 = 23.8$ |
| $r_3 = 398.541$ | $d_3 = 31.24\sim15.77\sim1$ | | |
| $r_4 = 272.964$ | $d_4 = 12.26$ | $n_4 = 1.88300$ | $v_4 = 40.8$ |
| $r_5 = -110.308$ | $d_5 = 1\sim16.47\sim31.24$ | | |
| $r_6 = 73.695$ | $d_6 = 34.05$ | $n_6 = 1.56873$ | $v_6 = 63.1$ |
| $r_7 = -71.846$ | $d_7 = 11.44$ | $n_7 = 1.85026$ | $v_7 = 32.3$ |
| $r_8 = 98.97$ | | | |
| $d_3 = 31.24$, | At $d_5 = 1$ | $f_n = -123.9$, | $f_p = 81.1$, $D = 13.2$ |
| WD = 150, | $f_o = 180.0$, | $f_o/WD = 1.2$ | |
| $d_3 = 15.77$, | At $d_5$ 16.47 | $f_n = -123.9$, | $f_p = 78.4$, $D = -4.4$ |
| WD = 250, | $f_o = 237.3$, | $f_o/WD = 0.95$ | |
| $d_3 = 1$, | At $d_5 = 31.24$ | $f_n = -123.9$, | $f_p = 76.0$, $D = -21.2$ |
| WD = 450, | $f_o = 352.7$, | $f_o/WD = 0.78$ | |

Embodiment 5

| | | | |
|---|---|---|---|
| $r_1 = -72.695$ | $d_1 = 15.71$ | $n_1 = 1.77250$ | $v_1 = 49.6$ |
| $r_2 = -66.231$ | $d_2 = 1$ | | |
| $r_3 = -25734.747$ | $d_3 = 18.14$ | $n_3 = 1.55232$ | $v_3 = 63.7$ |
| $r_4 = -54.238$ | $d_4 = 5$ | $n_4 = 1.84666$ | $v_4 = 23.8$ |
| $r_5 = -93.496$ | $d_5 = 1$ | | |
| $r_6 = 129.011$ | $d_6 = 9.15$ | $n_6 = 1.88300$ | $v_6 = 40.8$ |
| $r_7 = -528.415$ | $d_7 = 30\sim11.2\sim1.06$ | | |
| $r_8 = -470.214$ | $d_8 = 5$ | $n_8 = 1.84666$ | $v_8 = 23.8$ |
| $r_9 = -89.676$ | $d_9 = 5$ | $n_9 = 1.88300$ | $v_9 = 40.8$ |
| $r_{10} = 76.104$ | | | |
| | $f_n = -71.8$, | $f_p = 66.3$ | |
| At $d_7 = 30$ | $f_n = -71.8$, | $f_p = 66.3$, | $D = -34.1$ |
| WD = 150, | $f_o = 120.0$, | $f_o/WD = 0.8$ | |
| At $d_7 = 11.2$ | $f_n = -71.8$, | $f_p = 66.3$, | $D = -15.4$ |
| WD = 250, | $f_o = 228.3$, | $f_o/WD = 0.91$ | |
| At $d_7 = 1.06$, | $f_n = -71.8$, | $f_p = 66.3$, | $D = -5.1$ |
| WD = 450, | $f_o = 444.9$, | $f_o/WD = 0.99$ | |

Embodiment 6

| | | | |
|---|---|---|---|
| $r_1 = 495.433$ | $d_1 = 10.603$ | $n_1 = 1.72916$ | $v_1 = 54.68$ |
| $r_2 = -46.77$ | $d_2 = 5.8$ | $n_2 = 1.84666$ | $v_2 = 23.78$ |
| $r_3 = -100.961$ | $d_3 = 0.2$ | | |
| $r_4 = 111.506$ | $d_4 = 5.8$ | $n_4 = 1.741$ | $v_4 = 52.68$ |
| $r_5 = 3383.857$ | $d_5 = 27.353\sim3.911$ | | |
| $r_6 = -260.542$ | $d_6 = 5.344$ | $n_6 = 1.84666$ | $v_6 = 23.78$ |
| $r_7 = -49.97$ | $d_7 = 4.9$ | $n_7 = 1.7859$ | $v_7 = 44.18$ |
| $r_8 = 67.721$ | | | |
| At $d_5 = 27.353$ | $f_n = -72.46$, | $f_p = 72.958$, | $D = -35.742$ |
| WD = 215, | $f_o = 150$, | $f_o/WD = 0.7$ | |

Embodiment 6

| At $d_5 = 13.314$ | $f_n = -72.46$, | $f_p = 72.958$, | $D = -21.703$ |
| --- | --- | --- | --- |
| $WD = 315$, | $f_o = 249.316$, | $f_o/WD = 0.79$ | |
| At $d_5 = 3.911$ | $f_n = -72.46$, | $f_p = 72.958$, | $D = -12.3$ |
| $WD = 515$, | $f_o = 447.954$, | $f_o/WD = 0.87$ | |

Embodiment 7

| $r_1 = -1396.503$ | $d_1 = 5.8$ | $n_1 = 1.883$ | $v_1 = 40.78$ |
| --- | --- | --- | --- |
| $r_2 = -145.126$ | $d_2 = 0.2$ | | |
| $r_3 = 89.574$ | $d_3 = 5.8$ | $n_3 = 1.84666$ | $v_3 = 23.78$ |
| $r_4 = 43.977$ | $d_4 = 11.094$ | $n_4 = 1.6968$ | $v_4 = 55.52$ |
| $r_5 = -369.023$ | $d_5 = 27.253\text{--}0.823$ | | |
| $r_6 = -249.999$ | $d_6 = 4.9$ | $n_6 = 1.72916$ | $v_6 = 54.68$ |
| $r_7 = 33.227$ | $d_7 = 4.953$ | $n_7 = 1.85026$ | $v_7 = -32.28$ |
| $r_8 = 58.947$ | | | |
| At $d_5 = 27.253$ | $f_n = -72.695$, | $f_p = 75.016$, | $D = -41.429$ |
| $WD = 215$, | $f_o = 139.443$, | $f_o/WD = 0.65$ | |
| At $d_5 = 11.219$ | $f_n = -72.695$, | $f_p = 75.016$, | $D = -25.395$ |
| $WD = 315$, | $f_o = 236.347$, | $f_o/WD = 0.75$ | |
| At $d_5 = 0.823$ | $f_n = -72.695$, | $f_p = 75.016$, | $D = -14.999$ |
| $WD = 515$, | $f_o = 430.155$, | $f_o/WD = 0.84$ | |

Embodiment 8

| $r_1 = 166.942$ | $d_1 = 5.8$ | $n_1 = 1.80518$ | $v_1 = 25.43$ |
| --- | --- | --- | --- |
| $r_2 = 63.844$ | $d_2 = 9.971$ | $n_2 = 1.618$ | $v_2 = 63.38$ |
| $r_3 = -158.253$ | $d_3 = 0.2$ | | |
| $r_4 = 127.687$ | $d_4 = 5.8$ | $n_4 = 1.741$ | $v_4 = 52.68$ |
| $r_5 = -410.021$ | $d_5 = 27.712\text{--}0.834$ | | |
| $r_6 = -264.889$ | $d_6 = 4.9$ | $n_6 = 1.72916$ | $v_6 = 54.68$ |
| $r_7 = 33.597$ | $d_7 = 5.617$ | $n_7 = 1.85026$ | $v_7 = 32.28$ |
| $r_8 = 62.657$ | | | |
| At $d_5 = 27.712$ | $f_n = -78.371$, | $f_p = 76.574$, | $D = -38.21$ |
| $WD = 215$, | $f_o = 150$, | $f_o/WD = 0.7$ | |
| At $d_5 = 11.486$ | $f_n = -78.371$, | $f_p = 76.574$, | $D = -21.984$ |
| $WD = 315$, | $f_o = 252.353$, | $f_o/WD = 0.8$ | |
| At $d_5 = 0.834$, | $f_n = -78.371$, | $f_p = 76.574$, | $D = -11.332$ |
| $WD = 515$, | $f_o = 457.062$, | $f_o/WD = 0.89$ | |

Embodiment 9

| $r_1 = 341.982$ | $d_1 = 5.8$ | $n_1 = 1.72916$ | $v_1 = 54.68$ |
| --- | --- | --- | --- |
| $r_2 = -124.091$ | $d_2 = 0.2$ | | |
| $r_3 = 127.419$ | $d_3 = 9.163$ | $n_3 = 1.618$ | $v_3 = 63.38$ |
| $r_4 = -80.46$ | $d_4 = 5.8$ | $n_4 = 1.84666$ | $v_4 = 23.78$ |
| $r_5 = -270.425$ | $d_5 = 29.237\text{--}0.562$ | | |
| $r_6 = -251.974$ | $d_6 = 4.9$ | $n_6 = 1.84666$ | $v_6 = 23.78$ |
| $r_7 = -57.244$ | $d_7 = 4.9$ | $n_7 = 1.7859$ | $v_7 = 44.18$ |
| $r_8 = 75.009$ | | | |
| At $d_5 = 29.237$ | $f_n = 77.365$, | $f_p = 77.283$, | $D = -42.121$ |
| $WD = 215$, | $f_o = 141.643$, | $f_o/WD = 0.66$ | |
| At $d_5 = 11.764$ | $f_n = -77.365$, | $f_p = 77.283$, | $D = -24.648$ |
| $WD = 315$, | $f_o = 241.781$, | $f_o/WD = 0.77$ | |
| At $d_5 = 0.562$ | $f_n = -77.365$, | $f_p = 77.283$, | $D = -13.446$ |
| $WD = 515$, | $f_o = 442$, | $f_o/WD = 0.86$ | |

Embodiment 10

| $r_1 = 188.249$ | $d_1 = 5.5$ | $n_1 = 1.84666$ | $v_1 = 23.78$ |
| --- | --- | --- | --- |
| $r_2 = 65.21$ | $d_2 = 10.15$ | $n_2 = 1.6968$ | $v_2 = 55.52$ |
| $r_3 = -145.097$ | $d_3 = 0.2$ | | |
| $r_4 = 127.251$ | $d_4 = 5.5$ | $n_4 = 1.72$ | $v_4 = 50.25$ |
| $r_5 = -1556.541$ | $d_5 = 29.299\text{--}0.92$ | | |
| $r_6 = -433.572$ | $d_6 = 4.751$ | $n_6 = 1.84666$ | $v_6 = 23.78$ |
| $r_7 = -67.376$ | $d_7 = 4.6$ | $n_7 = 1.795$ | $v_7 = 45.29$ |
| $r_8 = 71.722$ | | | |
| At $d_5 = 29.299$ | $f_n = -80.933$ | $f_p = 77.916$, | $D = -39.02$ |
| $WD = 215$, | $f_o = 149.997$, | $f_o/WD = 0.7$ | |
| At $d_5 = 12.098$ | $f_n = -80.933$, | $f_p = 77.916$ | $D = -21.822$ |
| $WD = 315$, | $f_o = 253.867$, | $f_o/WD = 0.81$ | |
| At $d_5 = 0.92$ | $f_n = -80.933$, | $f_p = 77.916$, | $D = -10.644$ |
| $WD = 515$, | $f_o = 461.604$, | $f_o/WD = 0.9$ | | wherein the reference symbols $r_1, r_2, \ldots$ represent raii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

Figure 1B:
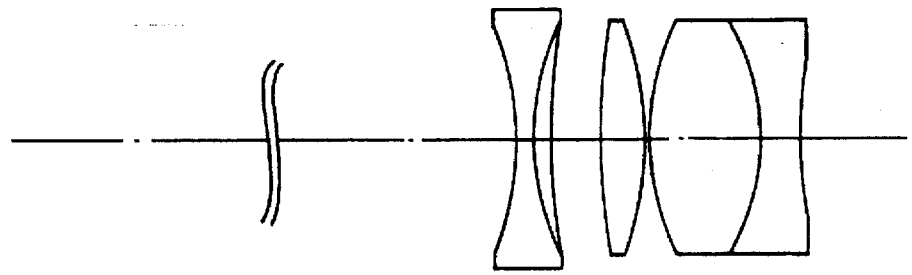
Figure 1C:
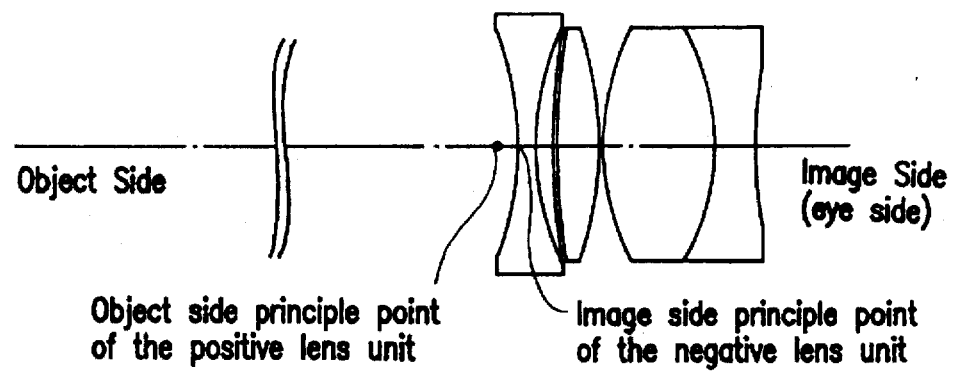
Figure 2A:
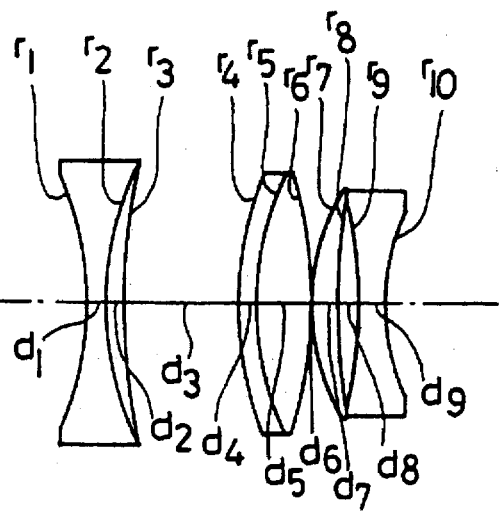
FIG. 2A, FIG. 2B and FIG. 2C show sectional views illustrating a composition of a second embodiment of the objective lens system of the stereomicroscope according to the present invention.
Figure 2B:
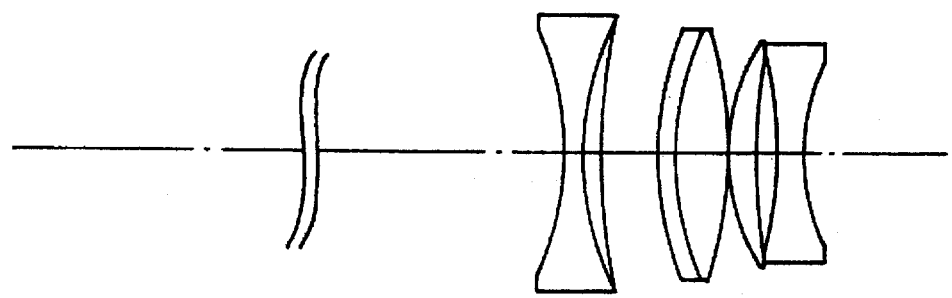
Figure 2C:
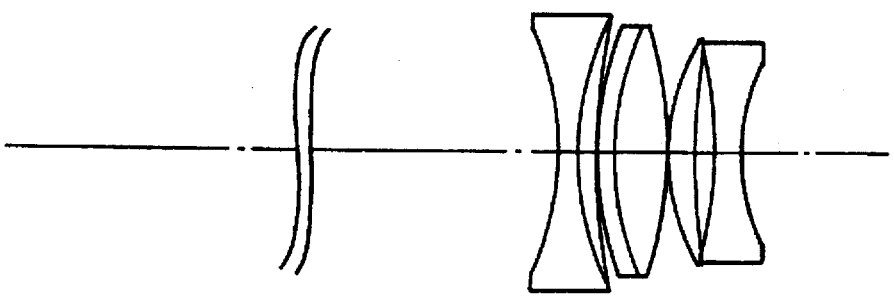

Out of the embodiments described above, the first embodiment and the second embodiment have the compositions shown in FIG. 1A, FIG. 1B and FIG. 1C; and FIG. 2A, FIG. 2B and FIG. 2C respectively. In each of these embodiments, the objective optical system of the stereomicroscope according to the present invention consists of a negative lens unit and a positive lens unit having a concave surface at a location on the most eye side, and is configured so as to change a working distance thereof by varying an optical path length in an airspace reserved between the negative lens unit and the positive lens unit.

Each of these embodiments is configured so as to cancel spherical aberration and chromatic aberration produced by the surfaces having positive refractive powers in the positive lens unit with spherical aberration and chromatic aberration produced by the cemented surface used in the positive lens unit, and cancel spherical aberration and chromatic aberration produced by the surfaces other than the cemented surface in the negative lens unit with spherical aberration and chromatic aberration produced by the cemented surface used in the negative lens unit, so that the aberrations remaining in both the lens units are cancelled with each other between these lens units. Further, the positive lens component disposed in the positive lens unit serves for distributing the positive refractive power, thereby correcting aberrations favorably.

Figure 3A:
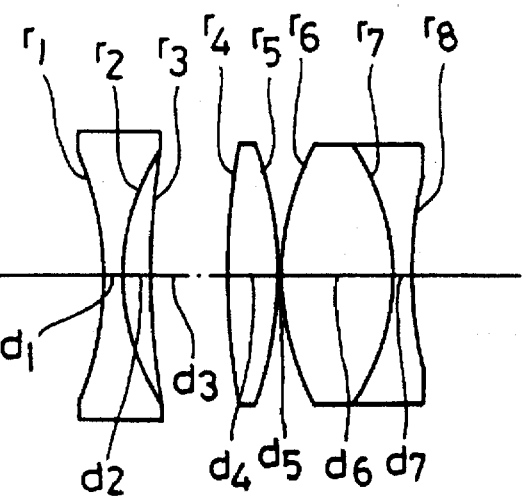
FIG. 3A, FIG. 3B and FIG. 3C show sectional views illustrating a composition of a third embodiment of the objective lens system of the stereomicroscope according to the present invention.
Figure 3B:
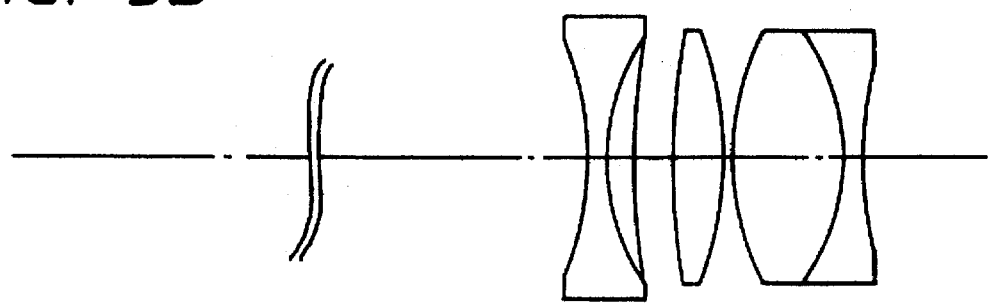
Figure 3C:
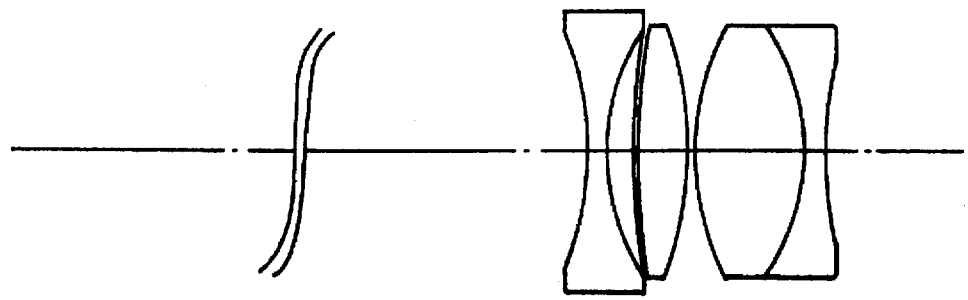
Figure 4A:
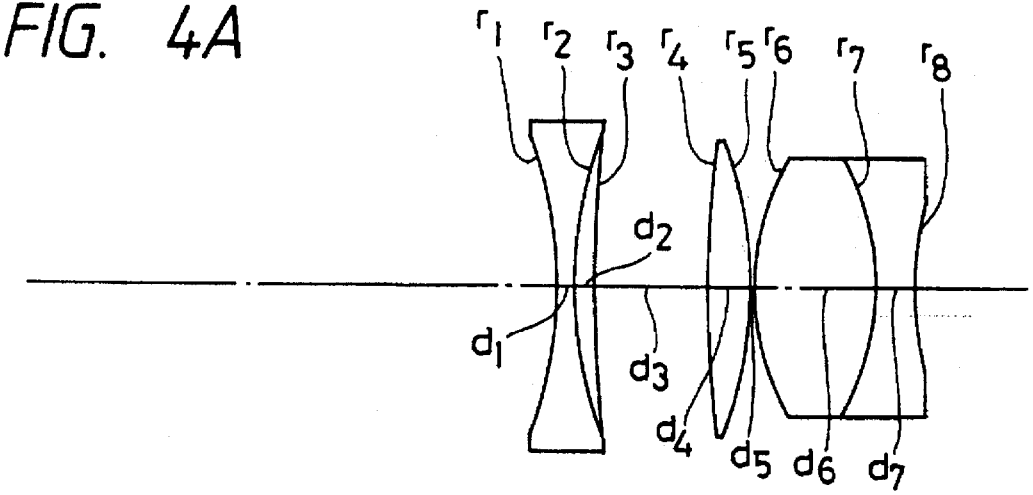
FIG. 4A, FIG. 4B and FIG. 4C show sectional views illustrating a composition of a fourth embodiment of the objective lens system of the stereomicroscope according to the present inveniton.
Figure 4B:
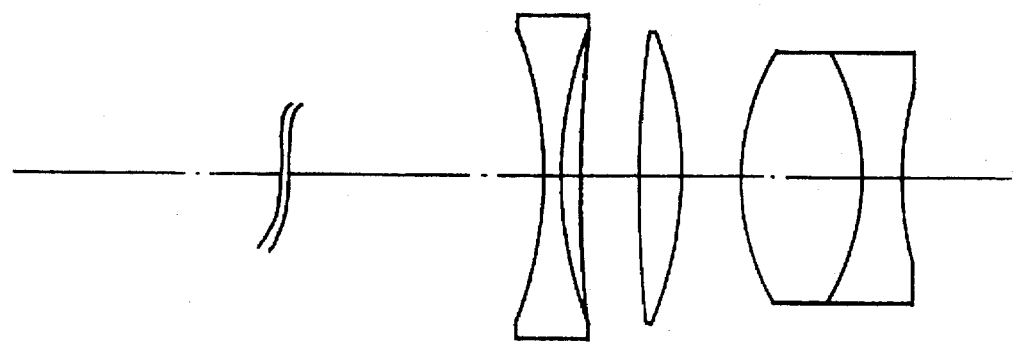
Figure 4C:
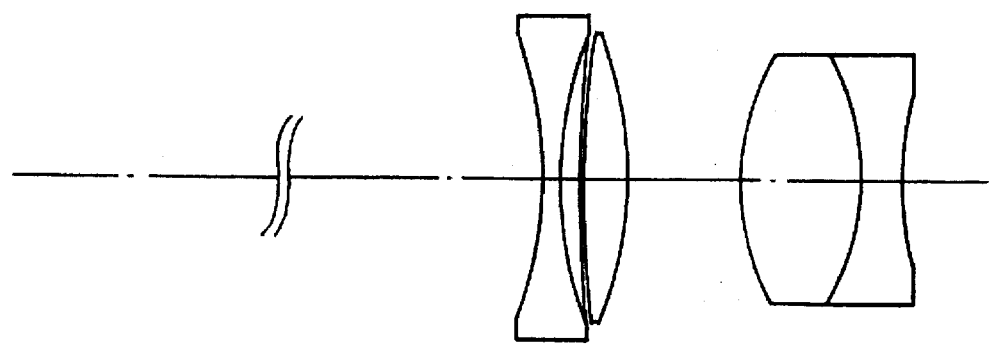

Furhther, the third embodiment and the fourth embodiment have the compositions illustrated in FIG. 3A, FIG. 3B and FIG. 3C; and FIG. 4A, FIG. 4B and FIG. 4C respectively. Each of these embodiments is configured so as to change a working distance thereof by varying an optical path length between a first negative lens unit and a second positive lens unit disposed in order from the object side, and another optical path length between the second lens unit and a third negative lens unit.

Figure 5A:
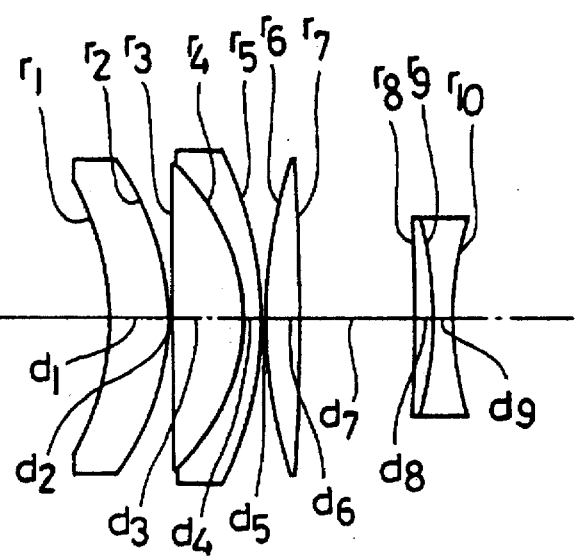
FIG. 5A, FIG. 5B and FIG. 5C show sectional views illustrating a composition of a fifths embodiment of the objective lens system of the stereomicroscope according to the present invention.
Figure 5B:
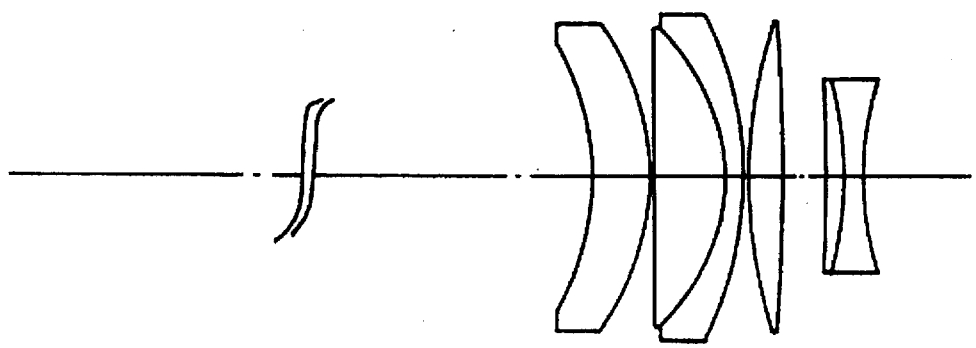
Figure 5C:
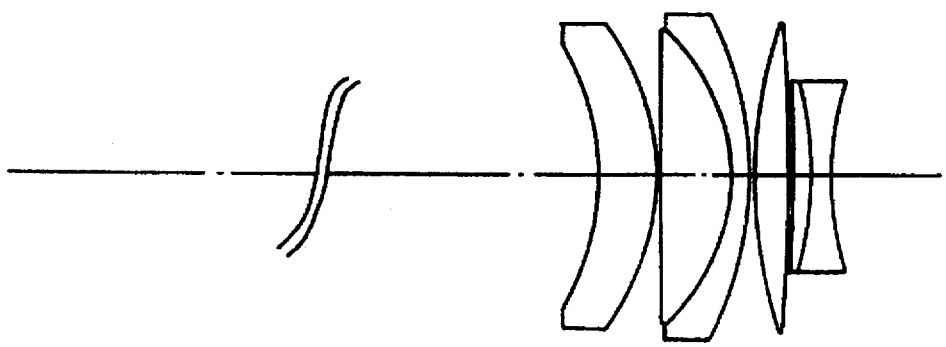

The fifth embodiment has the composition illustrated in FIG. 5A, FIG. 5B and FIG. 5C or consists, in order from the object side, of a positive lens unit and a negative lens unit, and is configured so as to change a working distance thereof by varying an optical path length between these two lens units. An objective lens system of this type can have a focal length which is shorter than a working distance thereof, and enhance a total magnification and a stereoscopic impression of an image observed through the microscope. Further, this type of objective lens system permits shortening the base line length L for obtaining the same stereoscopic impression.

The objective lens system preferred as the fifth embodiment uses lens elements in a number larger by one than in the positive lens unit that of the lens elements used in each of the sixth through tenth embodiments. Accordingly, the fifth embodiment corrects aberrations more favorably and can have a larger numerical aperture.

Figure 6A:
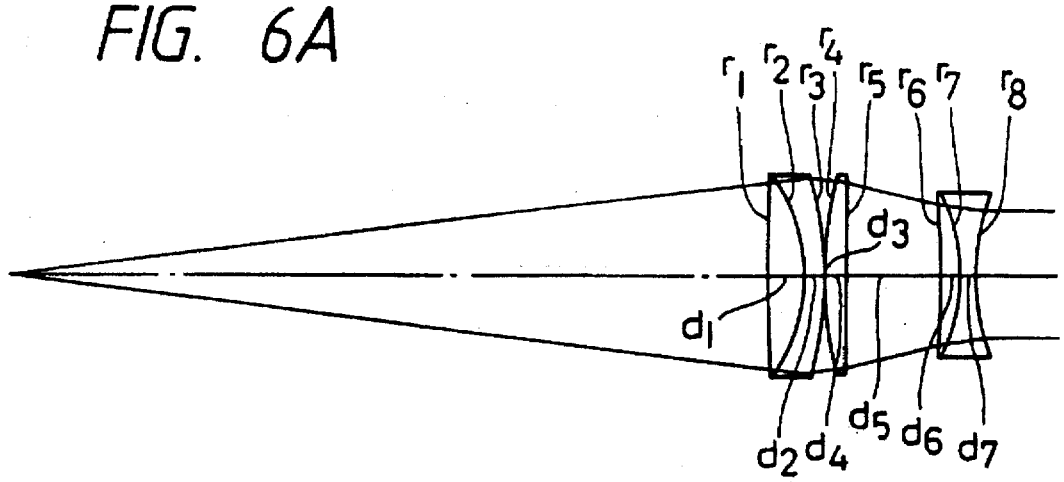
FIG. 6A, FIG. 6B and FIG. 6C show sectional views illustrating a composition of a sixth embodiment of the objective lens system of the stereomicroscope according to the present invention.
Figure 6B:
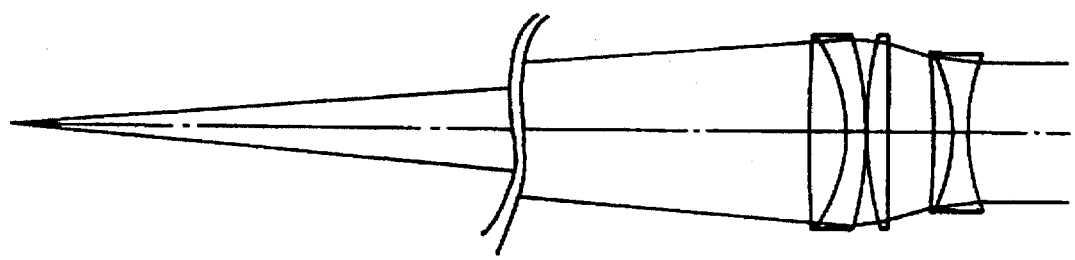
Figure 6C:
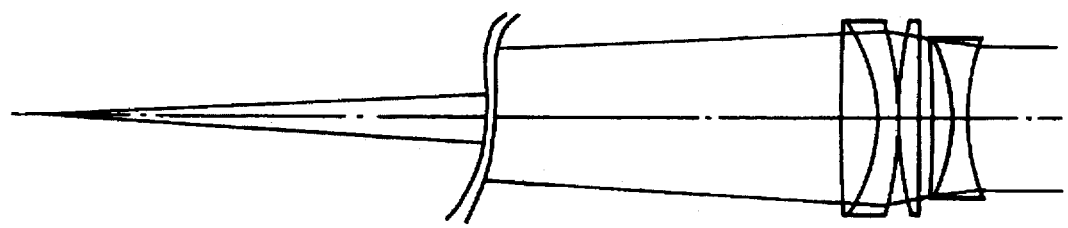
Figure 7A:
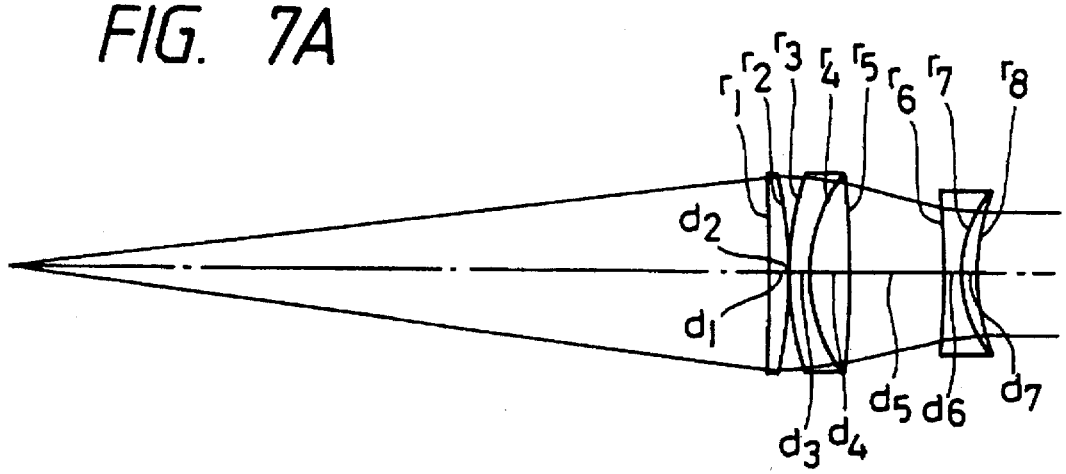
FIG. 7A, FIG. 7B and FIG. 7C show sectional views visualizing a composition of a seventh embodiment of objective lens system of the stereomicroscope according to the present invention.
Figure 7B:
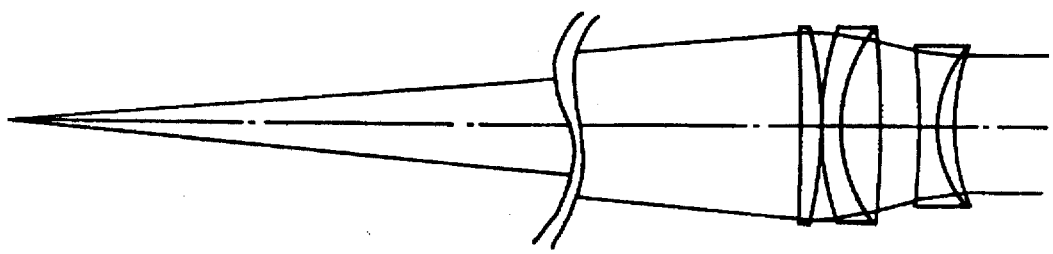
Figure 7C:
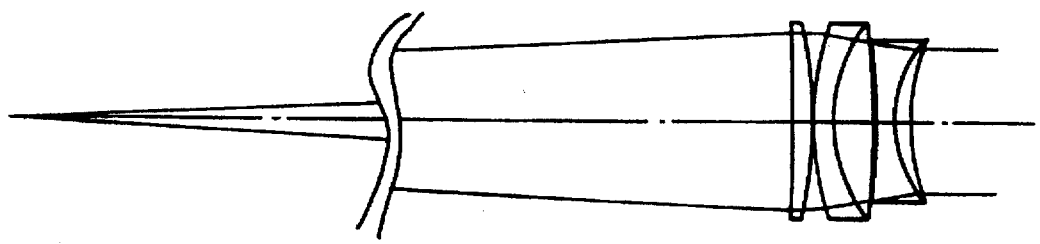
Figure 8A:
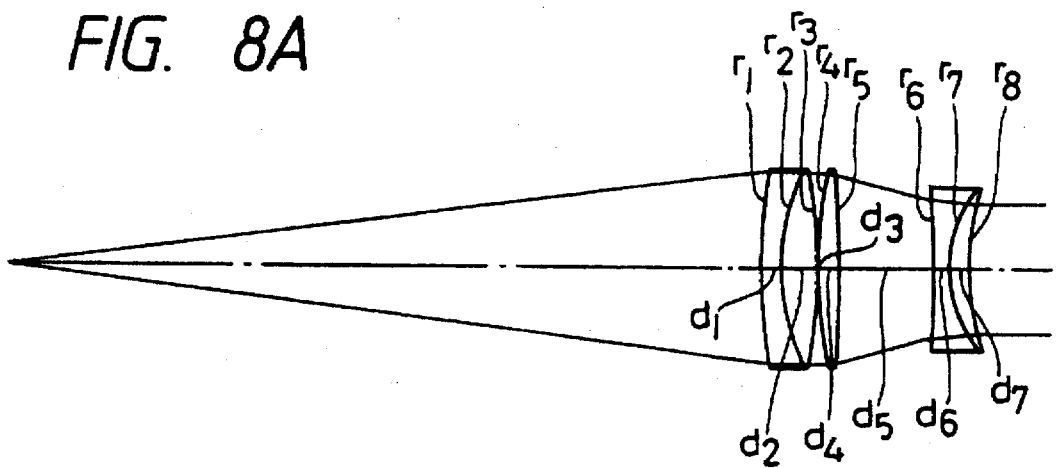
FIG. 8A, FIG. 8B and FIG. 8C show sectional views, visualizing a composition of an eighth embodiment of the objective lens system of the stereomicroscope according to the present invention.
Figure 8B:
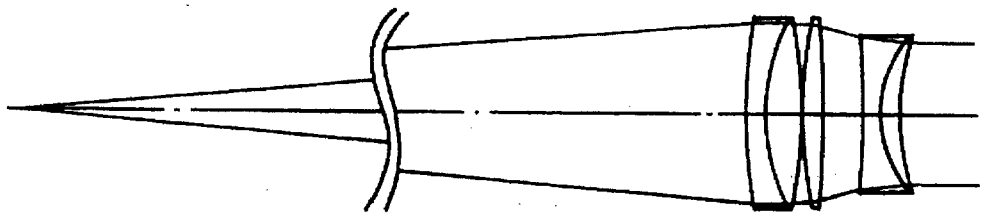
Figure 8C:
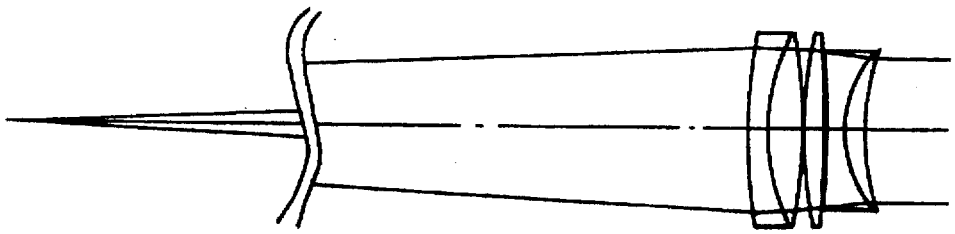
Figure 9A:
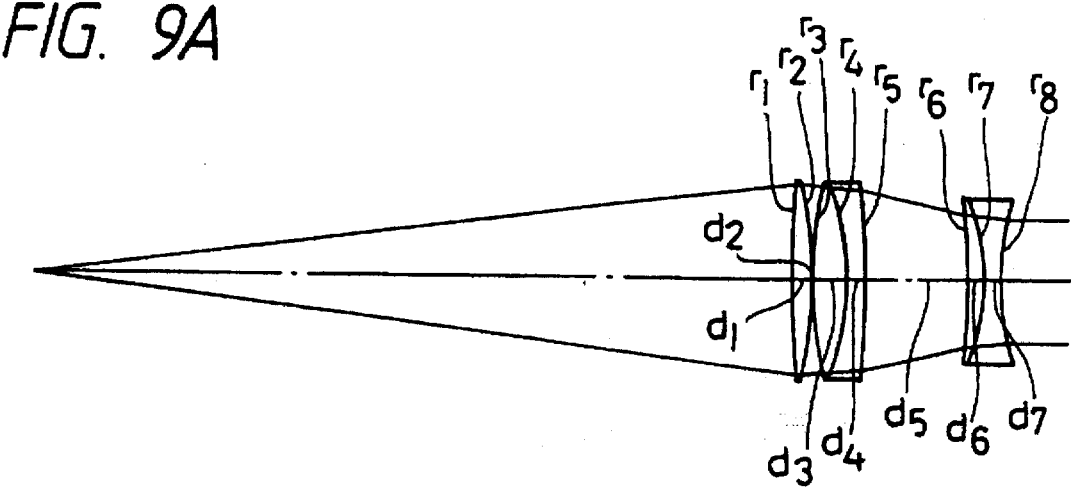
FIG. 9A, FIG. 9B and FIG. 9C show sectional views visualizing a composition of a ninth embodiment of the objective lens system of the stereomicroscope according to the present invention.
Figure 9B:
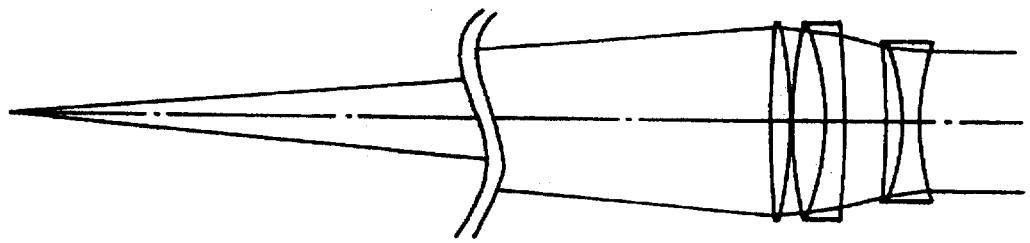
Figure 9C:
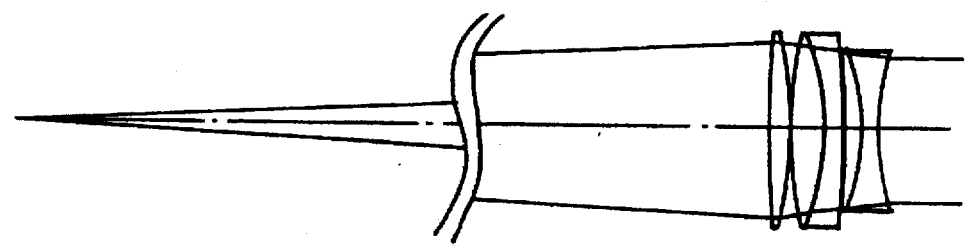
Figure 10A:
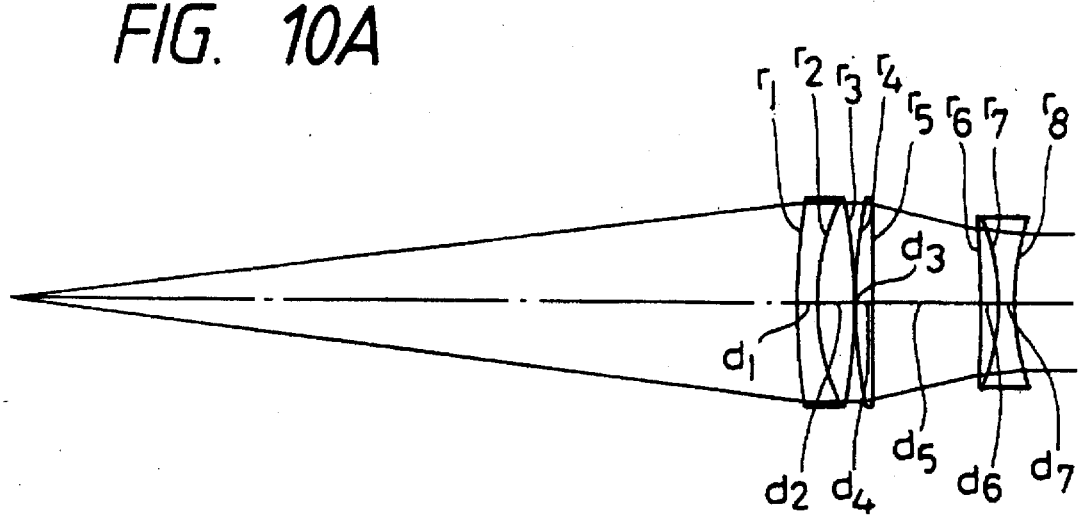
FIG. 10A, FIG. 10B and FIG. 10C show sectional views illustrating a composition of a tenth embodiment of the objective lens system of the stereomicroscope according to the present invention.
Figure 10B:
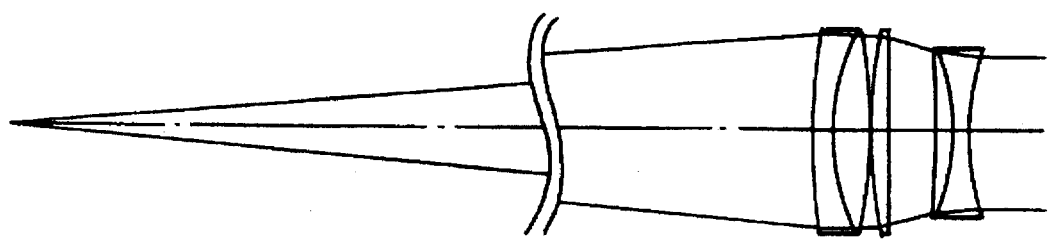
Figure 10C:
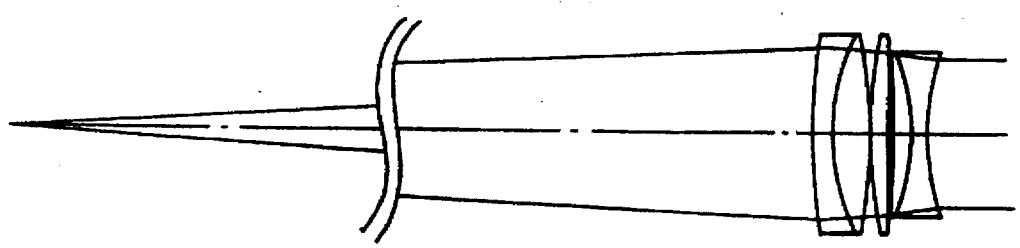
Figure 11A:
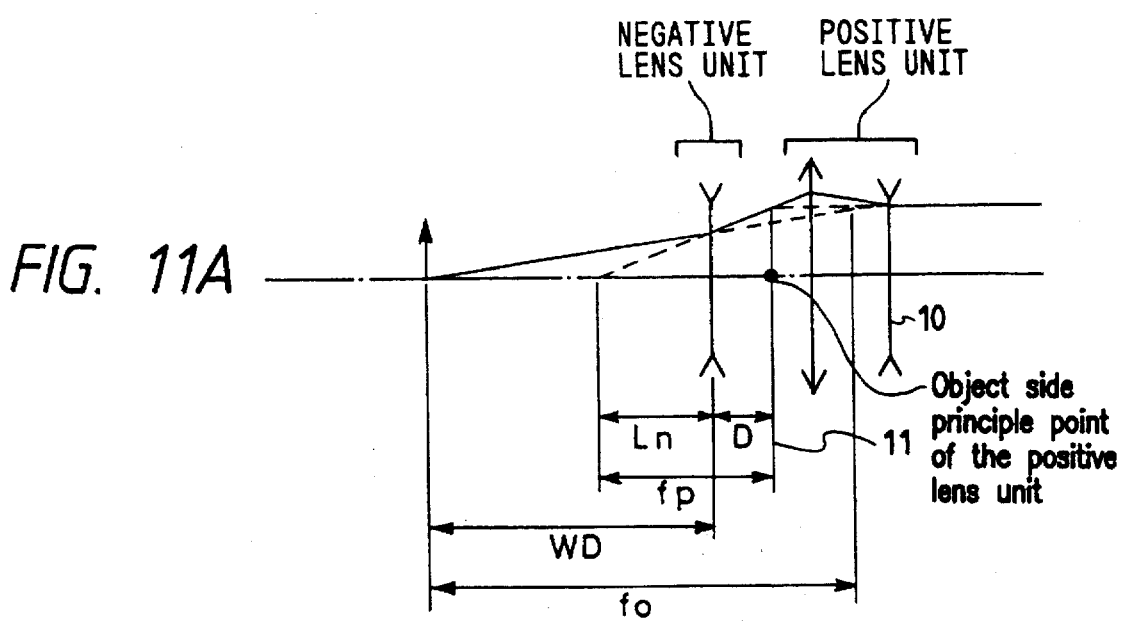
FIG. 11A, FIG. 11B and FIG. 11C show diagrams descriptive of a principle of the present invention.
Figure 11B:
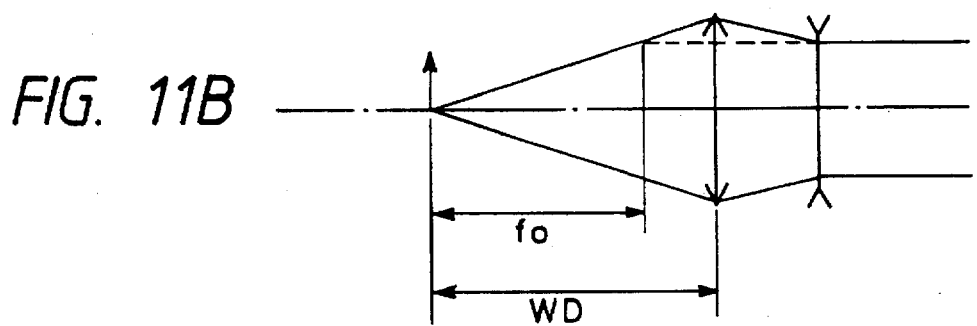
Figure 11C:
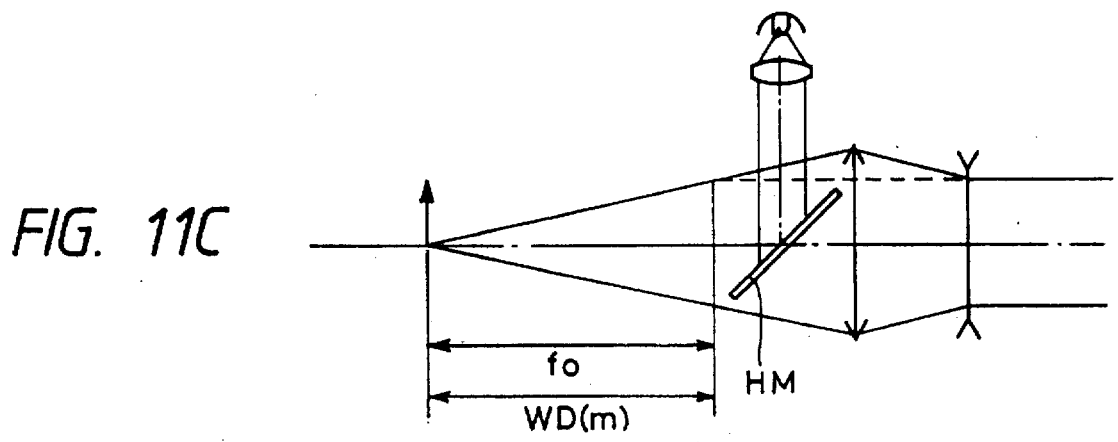

The sixth embodiment, the seventh embodiment, the eighth embodiment, the ninth embodiment and the tenth embodiment have the compositions illustrated in FIG. 6A, FIG. 6B, FIG. 6C; FIG. 7A, FIG. 7B, FIG. 7C; FIG. 8A, FIG. 8B, FIG. 8C; FIG. 9A, FIG. 9B, FIG. 9C; and FIG. 10A, FIG. 10B, FIG. 10C respectively in each of which an objective lens system consists, in order from the object side, of a positive lens unit and a negative lens unit as in the fifth embodiment, and is configured so as to change a working distance thereof by varying an optical path length between these two lens units. Unlike the fifth embodiment, each of the objective lens systems preferred as the sixth through tenth embodiments uses a positive cemented lens component and a positive lens component for composing the positive lens unit so that the objective lens system has a total length as short as possible.

Since the objective lens system is configured so as to change the working distance thereof by varying the airspace reserved between the positive lens unit and the negative lens unit as described above, each of these lens units is configured so as to produce minimum aberrations for obtaining favorably corrected aberrations at all working distances. Aberrations remaining in these lens units are cancelled with each other so as to correct aberrations favorably in the objective lens system as a whole.

For this purpose, both the lens adopt the cemented lens components, and favorably correct spherical aberration and chromatic aberration by utilizing differences in refractive indices and dispersing powers between glass materials selected for the lens elements disposed before and after the cemented surfaces.

Further, the lens units must have strong refractive powers for making a total length of the objective lens systems as short as possible. Furthermore, rays are higher on the positive lens unit than those on the negative lens unit. Accordingly, it is difficult to correct abrrations in the positive lens unit in particular. Therefor, an additional positive lens component is disposed in the positive lens unit for preventing the total length of the objective lens system from being prolonged while correcting aberrations favorably.

In each of the sixth and seventh embodiments, the positive lens component is disposed on the side of a negative lens element of the positive cemented lens component. In this embodiment, a axial marginal ray is incident obliquely with regard to the optical axis and nearly perpendicularly on the cemented surface. The apochromatic effect becomes lower as the axial marginal ray is incident more perpendicularly on the cemented surface. In order to prevent the apochromatic effect from being lowered, the cementd surface must have high curvature, thereby thinning marginal portions of the positive lens element. When the marginal portions of the positive lens element are thickened, the objective lens system has a larger total length. When no strict restriction is imposed on the total length of the objective lens system, however, an objective lens system of such a type as the sixth embodiment or the seventh embodiment can correct aberrations favorably.

The axial marginal ray is incident nearly perpendicularly on the cemented surface when refractive powers are not distributed uniformly before and after the cemented surface. In the sixth embodiment, for example, surfaces which have positive refractive powers are $r_1$, $r_3$, $r_4$ and $r_5$. The surface $r_1$ has a refractive power of 0.0035 and the surfaces $r_3$ through $r_5$ have a refractive power of 0.034, whereby the refractive powers are not distributed uniformly before and after the cemented surface. Since glass materials usable for an apohromatic cemented lens component are originally limited for reserving a large difference between Abbe's numbers of a positive lens element and a negative lens element thereof, the positive lens element has a low refractive index and the surface $r_1$ can hardly have a refractive power. Accordingly, almost all the refractive power of the positive lens unit is imparted to the negative lens element of the cemented lens component and the axial marginal ray is incident perpendicularly onto the cemented surface. This fact applies similarly to the seventh embodiment.

In each of the eighth through tenth embodiment, a positive single lens component is disposed on the side of a positive lens element of a positive cemented lens component. When the positive single lens component is disposed at such a location, refractive powers are distributed nearly uniformly before and after the cemented surface and the axial marginal ray does not travel in a direction perpendicular to the cemented surface, thereby making it easy to configure the objective lens system as an achromate.

In the eighth embodiment, for example, surfaces $r_1$, $r_3$, $r_4$ and $r_5$ have positive refractive powers in the positive lens unit. The surface $r_1$ has a refracitve power of 0.011, whereas the surfaces $r_3$, $r_4$, and $r_5$ have a refractive power of 0.028. Further, the positive cemented lens components used in the eighth through tenth embodiments have cemented surfaces which have curvature lower than that selected for the sixth and seventh embodiments. Accordingly, the eighth through tenth embodiments have compositions which permit correcting aberrations more easily than those of the sixth and seventh embodiments.

The eighth through tenth embodiments are different from one another in compositions of the positive lens units and the negative lens units. The principal point of the positive lens unit can be displaced on the object side so as to prolong a distance as measured from the prinipal point of the negative lens unit by disposing a positive lens component on the object side as in the ninth embodiment. Further, the principal point of the negative lens unit can be displaced on the side of eyes so as to prolong the distance between the principal points by disposing a positive lens component on the side of eyes as in the eighth embodiment.

It is possible to adjust the distance between the principal points and design objective lens systems having desired specifications by combining the dispositions of the positive lens components. For examle, it is possible from the formula (5') to obtain a smaller value of $f_o/WD$ as the distance D between the principal points (negative in the sixth through tenth embodiments) has a larger negative value or prolong $f_p$ when $f_o/WD$ has a prefixed value.

Figure 12:
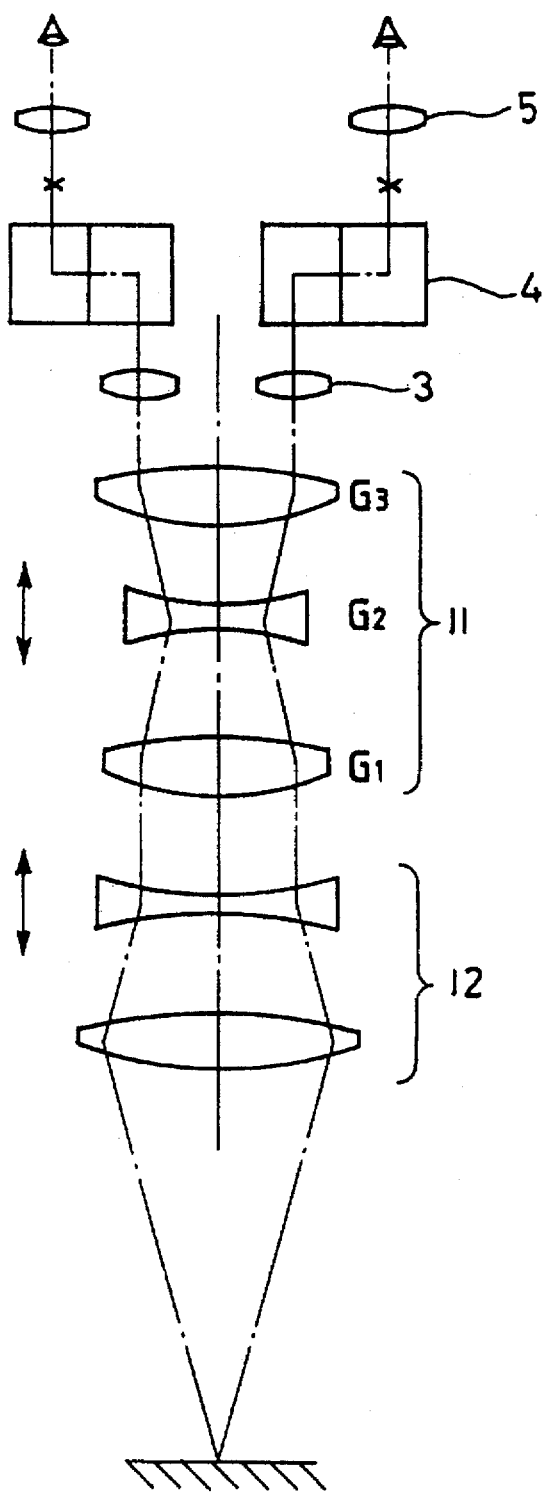
FIG. 12 shows a sectional view illustrating a composition of a vari-focal lens system which is common to right side and left side eyepieces.

In addition, each of the embodiments described above can be combined with a single vari-focal lens system 11 which is common to right and left eyepieces as shown in FIG. 12. In FIG. 12, the reference numeral 12 represents an objective lens system permitting changing a working distance thereof and a vari-focal lens system has an optical axis which is common to an objective lens system 12. Light bundles which are emitted from an object and are to be incident on right and left eyes pass through poriotns off an optical axis of the objective lens system 12 and the vari-focal lens system 11. Out of a positive lens component $G_1$, a negative lens component $G_2$ and a positive lens component $G_3$, at least the negative lens component $G_3$ is moved along the optical axis for changing a magnification of the microscope. In this case, the magnification is changed by moving, for example, the positive lens component $G_1$ and the negative lens component $G_2$ along the optical axis or the negative lens component $G_2$ and the positive lens component $G_3$ along the optical axis.

Further, the magnification of the microscope can be changed by disposing a pair of right and left afocal vari-focal lens systems, in place of the single vari-focal lens system common to the right and left eyepieces shown in FIG. 12, after (on the image side of) the objective lens system and by using these afocal vari-focal lens systems.

Figure 13:
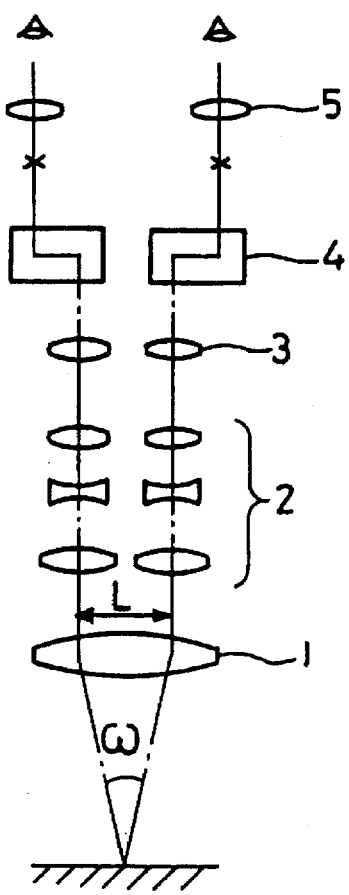
FIG. 13 shows a sectional view illustrating a composition of a Galilean stereomicroscope.
Figure 14:
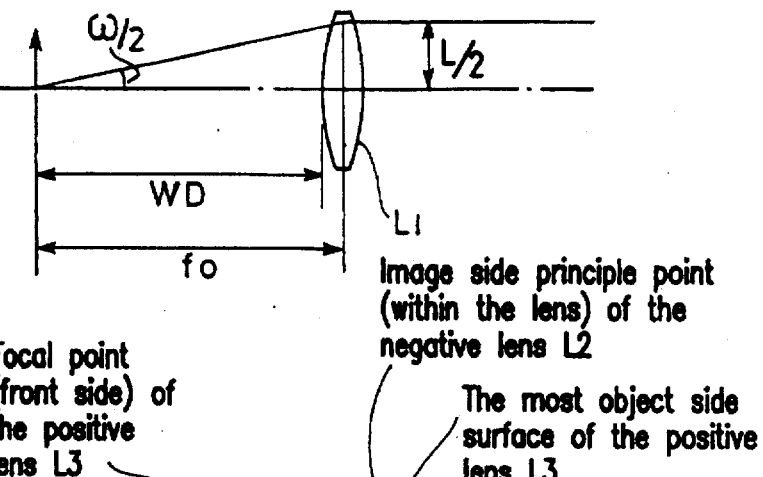
FIG. 14 shows a diagram visualizing relationship between a focal length and a working distance of an objective lens component having a fixed focal point.
Figure 15:
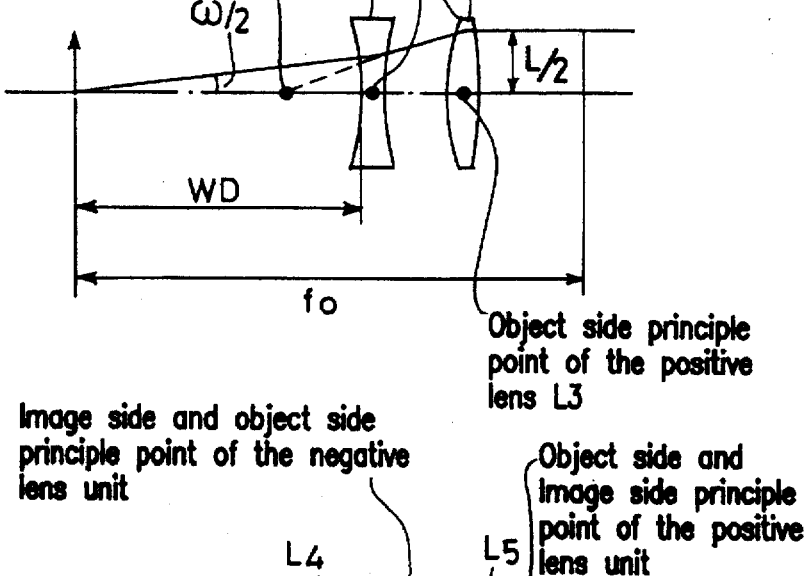
FIG. 15 shows a diagram visualizing relationship between a focal length and a working distance of a conventional objective lens system permitting changing a working distance thereof.
Figure 16:
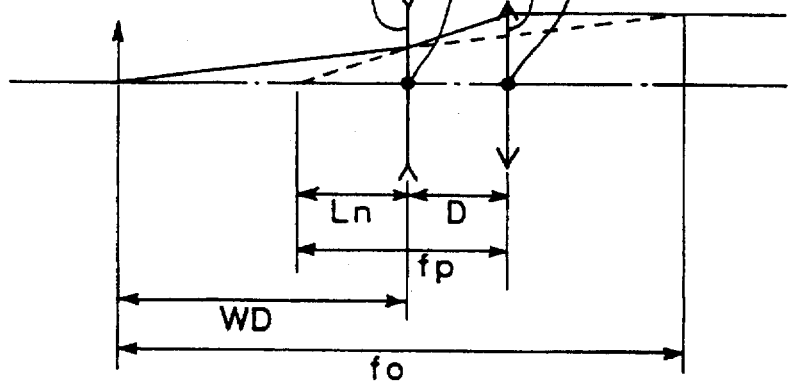
FIG. 16 shows a diagram descriptive of a refractive power distribution in the conventional objective lens system.

In a Galilean stereomicroscope illustrated in FIG. 13, the objective lens system, is replaced with the objective lens system described above which permits changing the working distance thereof.

The stereomicroscope according to the present invention, which comprises the objective lens system permitting changing a working distance thereof, can have a focal length equal or shorter to or than a working distance, makes it possible to lessen lowering or obtain enhancement of a total magnification of the microscope and stereoscopic impression of images observed through the microscope.

I claim:

1. A stereomicroscope comprising an afocal variable focal length optical system, an imaging lens system and eyepiece lens systems, which are disposed after a single objective lens system, wherein said single objective lens system emits a parallel light bundle, and comprises, in order from the object side, a negative lens unit and a positive lens unit, and said objective lens system is configured so as to permit changing a working distance thereof by varying an airspace reserved between said negative lens unit and said positive lens unit; wherein said working distance is 150 mm at minimum but 515 mm at maximum, and wherein said objective lens system has a concave surface at a location farthest from an object to be observed.

2. A stereomicroscope according to claim 1 wherein at least one of said negative lens unit and said positive lens unit comprises a cemented lens component.

3. A stereomicroscope according to claim 1 wherein said positive lens unit comprises a positive single lens component.

4. A stereomicroscope according to claim 1 wherein said positive lens unit has a principal point at a location on the object side of a most object side surface of said positive lens unit.

5. A stereomicroscope according to claim 1 wherein an object side principal point of said positive lens unit is located on the object side of an image side prinicpal point of said negative lens unit when said negative lens unit and said positive lens unit are brought closest to each other.

6. A stereomicroscope comprising an afocal variable focal length optical system, an imaging lens system and eyepiece lens systems, which are disposed after a single objective lens system, wherein said single objective lens system emits a parallel light bundle, and comprises, in order from the object side, a positive lens unit and a negative lens unit, each of said positive lens unit and said negative lens unit comprises a cemented lens component; and said stereomicroscope is configured so as to permit changing a working distance thereof by varying an airspace reserved between said positive lens unit and said negative lens unit, wherein said working distance is 150 mm at minimum but 515 mm at maximum and the focal length of said objective lens system is almost the same as the working distance or smaller than the working distance.

7. A stereomicroscope comprising an afocal variable focal length optical system, an imaging lens system and eyepiece lens systems, which are disposed after a single objective lens system, wherein said single objective lens system emits a parallel light bundle, and comprises, in order from the object side, a positive lens unit and a negative lens unit, said positive lens unit comprises a cemented doublet and a positive single lens component, said negative lens unit comprises a cemented doublet, and said negative lens unit has a smaller outer diameter than that of said positive lens unit; and said stereomicroscope is configured so as to permit changing a working distance thereof by varying an airspace reserved between said positive lens unit and said negative lens unit.

8. A stereomicroscope comprising an afocal variable focal length optical system, an imaging lens system and eyepiece lens systems, which are disposed after a single objective lens system, wherein said objective lens system emits a parallel light bundle and comprises, in order from the object side, a negative lens unit and a positive lens unit, wherein said negative lens unit consists of a cemented doublet and said positive lens unit comprises a cemented doublet and a positive lens; wherein said stereomicroscope is configured so as to permit changing a working distance thereof by varying an airspace reserved between said positive lens unit and said negative lens unit; wherein said working distance is 150 mm at minimum but 515 mm at maximum; and wherein said objective lens system has a concave surface on the farthest surface from an object to be observed.

9. A stereomicroscope according to claim 1, 2, 3, 4, 5, 6, or 7 wherein a half mirror is disposed on one side of said objective lens system.

* * * * *